United States Patent [19]

Granberg

[11] 4,157,662
[45] Jun. 12, 1979

[54] LIQUID METER WITH COMPENSATED DUAL OUTPUTS

[76] Inventor: Albert J. Granberg, 6178 Estates Dr., Oakland, Calif. 94611

[21] Appl. No.: 885,372

[22] Filed: Mar. 10, 1978

[51] Int. Cl.$^2$ .............................................. G01F 15/02
[52] U.S. Cl. ................................................... 73/233
[58] Field of Search ...................... 73/231 M, 233, 229

[56] References Cited

U.S. PATENT DOCUMENTS

| | | | |
|---|---|---|---|
| 3,027,765 | 4/1962 | Fraser | 73/231 R X |
| 3,107,528 | 10/1963 | Ruff | 73/233 X |
| 3,224,273 | 12/1965 | Granberg | 73/233 |
| 3,258,965 | 7/1966 | Levins | 73/231 M X |
| 3,266,310 | 8/1966 | Ruffer | 73/233 |
| 3,580,073 | 5/1971 | Siebold | 73/233 |
| 3,969,939 | 7/1976 | Grzeslo | 73/231 M |

FOREIGN PATENT DOCUMENTS 857348 12/1960 United Kingdom ...................... 73/233

Primary Examiner—Daniel M. Yasich
Attorney, Agent, or Firm—Joseph L. Strabala

[57] ABSTRACT

By employing several independent variable compensating mechanisms between a positive displacement liquid meter unit and two output registers, which mechanisms are responsive to physical changes in the liquid passing through the meter unit, accurate readings in both gallons and pounds of liquid passing through the meter can be read directly from the registers. Obviously the registers can be calibrated in the metric equivalents.

4 Claims, 7 Drawing Figures

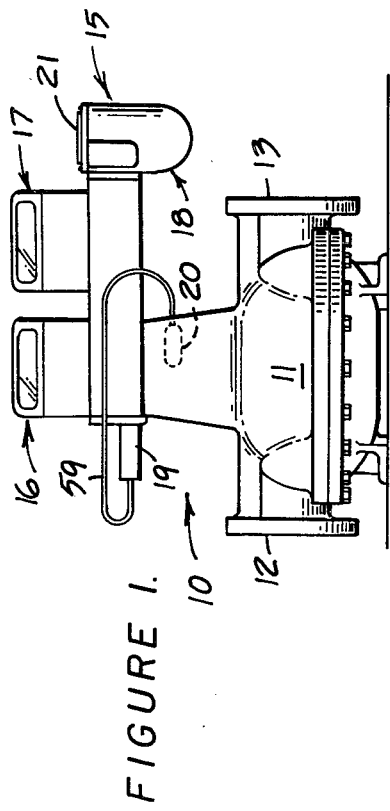
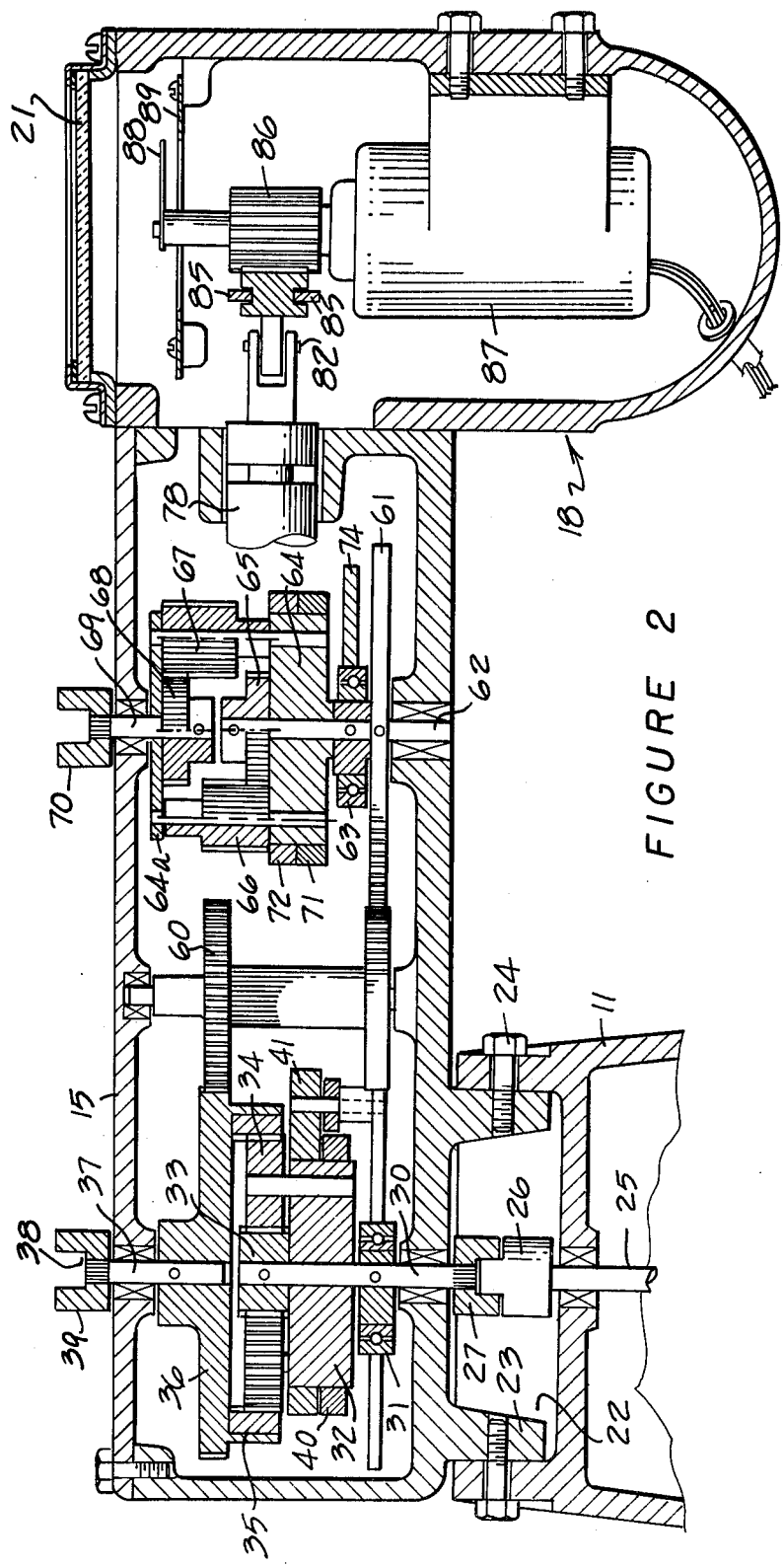
FIGURE 1.
FIGURE 2

LIQUID METER WITH COMPENSATED DUAL OUTPUTS

BACKGROUND OF THE INVENTION

Most meters are calibrated to measure the volume of liquid flowing through them in terms of gallons or cubic feet or the metric equivalent measures. Obviously since the temperature affects the density of the liquids, different volumes will be sensed by the meter at different temperatures for the same weight of liquid. For example, jet aircraft fuel has a high coefficient of expansion, resulting in a much higher weight of fuel for a given measured volume at 32° F. than at 80° F. In an environment where there are changing temperatures, it is not possible to accurately calculate the actual weight of the fuel measured in gallons unless a gallon/minute vs. temperature chart is available. Even then, only an approximation is available. Further, even if the chart is available, the continuous API gravity reading of the liquid or fuel must be known to better calculate the actual weight of liquid or fuel passing through the meter.

Currently, the fuel industry often sells by weight due to the wide range of American Petroleum Institute API densities of fuels at a given installation, as it is the most accurate method of determining the value sold and received. Fuel densities from API 32 to API 60 are quite common at some installations and require numerous meters and complex record keeping to approximate the weight of the fuel for a given number of gallons passing through a calibrated meter.

U.S. Pat. No. 3,283,575 issued to A. J. Granberg illustrates a temperature compensation device for a meter, and U.S. Pat. No. 3,020,758 issued to A. J. Granberg illustrates structure which adjusts a meter for changes in specific gravity. Also, U.S. Pat. No. 3,224,273 issued to A. J. Granberg discloses structure which adjusts a meter register or counter for changes in temperature or gravity. See U.S. Pat. No. 2,806,374 issued to A. J. Granberg regarding transmission systems for adjusting meter readings for calibration and compensations. These devices are related to the current invention, but cannot provide simultaneous dual readings of volume and weight.

Obviously, there is a need to have an accurate weight reading of liquid passing through positive displacement liquid meters, particularly when fuel is sold. Jet aircraft fuel consumption, for example, is measured in pounds per hour, and therefore most commercial jet operators would prefer to buy fuel by weight when possible, as it is more relevant to actual operation, as well as to value received.

The instant invention is designed to provide an accurate reading in gallons on one register, which is automatically and simultaneously converted into pounds or kilograms on a second or different register. By first converting the meter flow to accurate volume readings, such as gallons, and simultaneously converting this volume reading to pounds with appropriate compensation, very accurate weight can be directly read from the weight register at all times.

SUMMARY OF THE INVENTION

A direct reading liquid meter having a volume register and a weight register includes a basic meter casing having a rotating meter output shaft turning proportional to the volume passing through the meter; a housing mountable on said meter casing having an input shaft connected to the meter output shaft; a first compensating means connected to the input shaft and having a first variable transmission and first adjusting means for varying the output of said transmission; a transmission output shaft having a transmission output gear operably connected to said variable transmission; a volume register connected to the transmission output shaft; a second compensating means having a gear drive means connected to the transmission output gear; a second variable transmission operably driven by said gear drive means and second adjusting means for varying the output of the second transmission; gravity sensing means operably connected to the second adjusting means to vary the second transmission output proportional to the gravity of liquid passing through the meter casing; a second transmission output shaft connected to the second transmission; and a weight register connected to the second transmission output register shaft whereby one register accurately reflects volume and the other register accurately reflects weight of the liquid passing through the meter.

DESCRIPTION OF THE DRAWINGS

The objects and advantages of this invention will be apparent in the following specification wherein the invention is described in reference to the accompanying drawings, wherein:

FIG. 1 is an elevation of the liquid meter of this invention having the dual registers, one for volume and one for weight, mounted on a housing between the meter casing and the registers;

FIG. 2 is a cross-section of the housing illustrating the compensators, transmissions and gear trains of the several compensating mechanisms between the meter casing and the several registers;

DESCRIPTION OF THE PREFERRED EMBODIMENT

Figure 3:
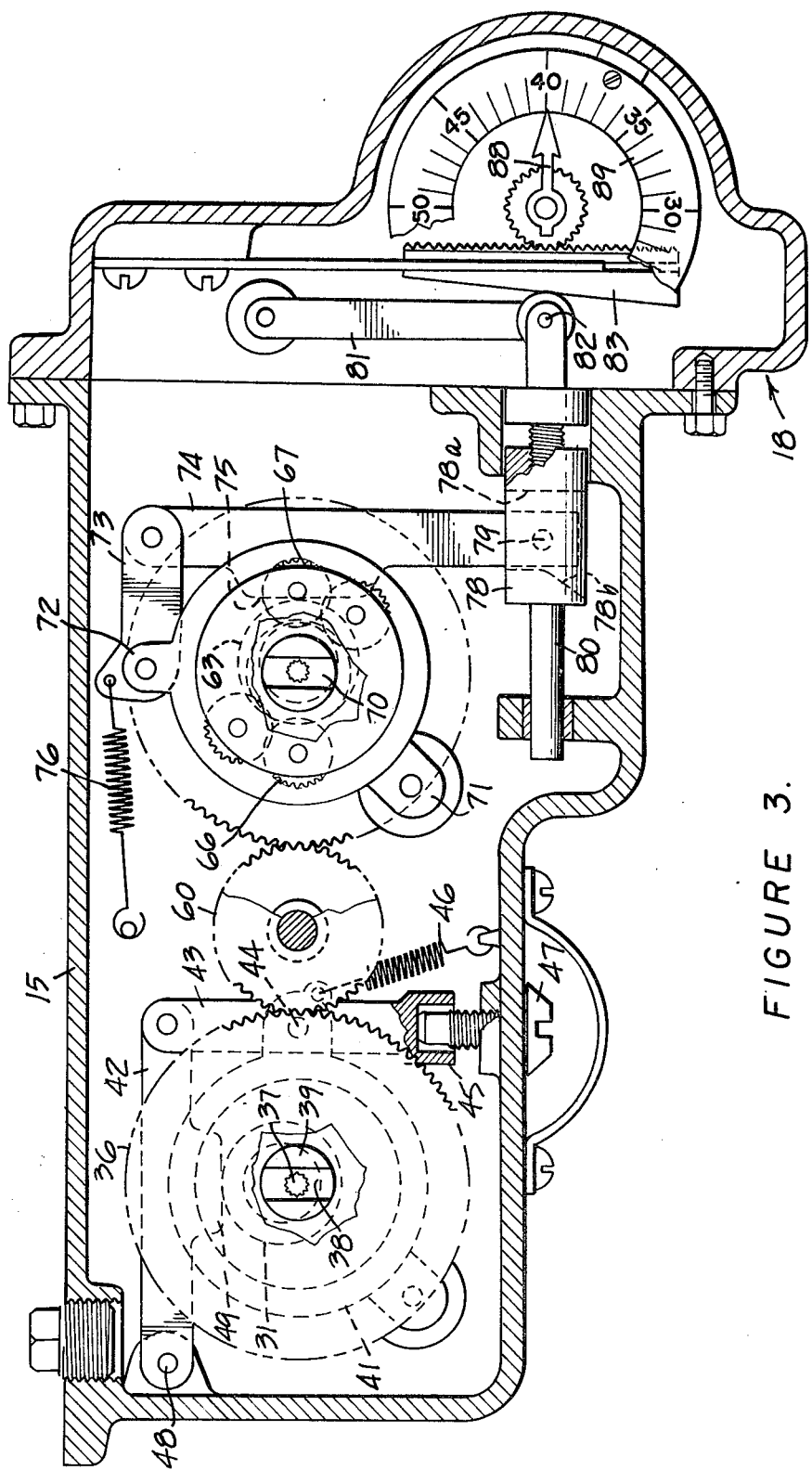
FIG. 3 is a section of FIG. 2 oriented normal to the section of FIG. 2, also showing the transmissions and gear trains along with parts of the compensating mechanisms controlling the transmissions.

In FIG. 1, the dual reading liquid meter 10 of this invention is shown in elevation. It includes a meter casing 11, having a rotatable component (not shown) measuring the liquid passing through the casing from the inlet 12 to the outlet 13 by a positive displacement arrangement. The casing and rotatable component are conventional in positive displacement meters and provide an output directly proportional to actual measured displacement without any compensation.

Mounted on the top of the meter casing 11 is a housing 15 which includes the compensating means which include elements, transmissions and adjusting mechanisms for correcting the registers 16 and 17 secured to the top of this housing. Register 16 is the volume or gallons register, while register 17 reads directly in weight or pounds. These two registers are sometimes referred to as counters, since the compensated rotation of the several output shafts of the housing can be engineered to give one revolution per gallon or per pound, respectively.

Also mounted on the housing 15 is a selsyn receiver unit 18 which provides continuous mechanical gravity information to the compensating means for the weight adjustments. In addition, a thermal compensator 19 is shown attached to the housing 15 in FIG. 1. This thermal compensator provides volume adjustment information by sensing a probe 20 in communication with the liquid passing through the meter casing 11 via capillary tube 59. A window 21 can be provided in the housing so that a pointer (see FIG. 3) showing the current API gravity can be viewed directly.

In FIGS. 2 and 3, the important compensating mechanisms of the meter 10 are shown. More particularly, they are located in housing 15 which is mounted in a recess 22 in the top of meter casing 11, which receives an extending rim 23 of the housing that is locked in the recess with screws 24. When so assembled, the output shaft 25 of the meter casing 11 is interlocked for common rotation with the input shaft 30 of the housing with bayonet-type couples 26 and 27.

Input shaft 30 extends into the housing 15 through an eccentric cam 31 keyed to it and a planet carrier 32, and terminates in a sun gear 33 to which it is keyed. With the exception of the cam, these parts form part of a transmission means with a planet gear 34 journalled on the carrier and meshing with the sun gear and an internal gear 35, the latter of which is connected to an output gear 36. A first output shaft 37 is oriented in the housing coaxially with shaft 30 and is keyed to output gear 36 with one end of shaft 37 extending through the housing. The projecting end has a bayonet fitting 38 mating with a similar fitting on the volume or gallons register 16 when the latter is mounted on the housing as shown in FIG. 1.

It can be appreciated that if the carrier 32 is stationary, the ratio of the transmission will be fixed by the number of teeth on the meshing gears. However if the carrier, held by a slip clutch ring 40, is incrementally rotated, it will either add or subtract from the output revolutions of output shaft 37 depending on the direction of rotation. Thus, compensation is achieved by controlling carrier 32. Some designs employ gear trains having outputs 4% below the desired value, using the incremental carrier rotation to accurately calibrate to ±2%. Such an arrangement is suitable for this design.

Figure 6:
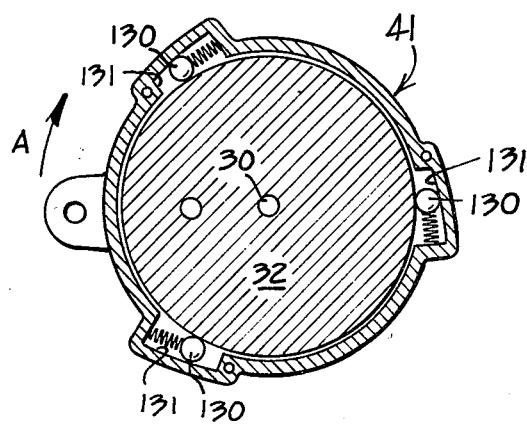
FIG. 6 is a section of a suitable ratchet ring showing the directional cams.

By referring to FIG. 3, the adjusting mechanisms for carrier 32 can be seen. Clutch ring 40 engages the carrier to stabilize it against rotation while a ratchet ring 41, which also engages the carrier, controls its incremental rotational movement by ratchet or cam elements that are positioned between the ring and the peripheral surface of the carrier. (See FIG. 6 showing spring loaded balls as ratchet elements.) The ratchet ring overrides the resistance of the clutch ring in one direction.

Ratchet ring 41 is, in turn, controlled by a linkage composed of two pivotedly connected arms 42 and 43, the latter of which is centrally connected to the ratchet ring by pin 44 and oriented so its distal end is abutted against an adjustment stop 45 under the influence of spring 46. The position of the stop is controlled by adjusting or calibration screw 47 so the meter can be calibrated.

Arm 42 has its distal end connected to the housing 15 with a pivot pin 48 so its cam lobe 49 will be engaged by eccentric cam 31 on the input shaft 30 during part of each revolution. As a result, depending on the setting of the stop, a small incremental rotational movement will be induced to the ratchet ring, and thus to the carrier, to incrementally vary the output shaft to compensate the volume or gallons register 16 for volumetric error.

Figure 5:
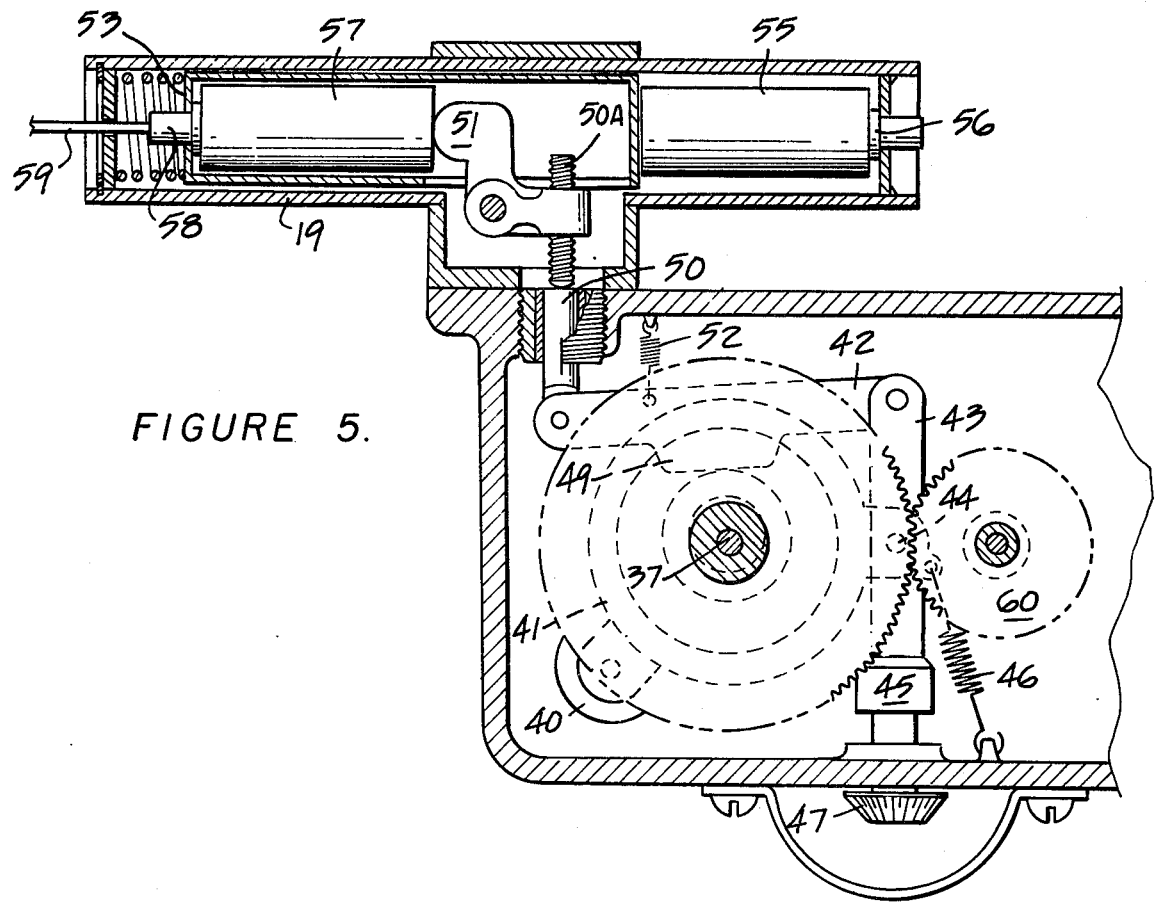
FIG. 5 is a partial section of the volume measuring transmission unit with a thermal compensator unit added to further improve the accuracy of the unit.

In FIG. 5, the distal end of arm 42 is pivotedly connected to a compensating plunger 50 that is responsive to ambient conditions and thermal conditions of any liquid passing through meter casing 11 as sensed by probe 20. The movement of the plunger will control the position of lobe 49 of arm 42 relative to the eccentric cam 31, thereby directly adjusting the incremental movement of carrier 32 by the operation described above.

As can be seen in FIG. 5, the thermal compensater has a bell crank 51 pivoted with a pin so it bears on plunger 50 through adjusting screw 50A, the plunger being held against the bell crank by the bias of a spring 52, connected between arm 42 and the housing 15.

A capsule 53 is slidably mounted in a bore of the thermal compensater 19 so a spring 54 causes the capsule to abut against a balancing bellows 55. The latter has a plunger 56 which extends or recedes in relation to the ambient pressure and temperature, thereby controlling the location of the capsule in the bore. The capsule includes a slot through which one end of bell crank 51 is received so it can abut against the end of a second bellows 57. This bellows likewise has a plunger 58 responsive to the temperature sensed by probe 20 through capillary tube 59. As a result, full thermal compensation for the gallon or volume register will be accomplished by the operation of these bellows. The bellows are filled with a volatile liquid such as alcohol or benezene and are well-known components, being sold as Sylphon bellows.

From the above description, it can be appreciated that the revolutions of the output gear 36 can be fully compensated for meter calibration and temperature to accurately read gallons, usually within ±0.01%. As a result, the output gear can provide one accurate input for a second compensating means for simultaneously converting gallons to pounds. This is done with a take-off gear 60 that meshes with output gear 36 and directly drives the input gear 61 of a second compensating means, which includes a transmission shaft 62 keyed thereto. Shaft 62 is journalled in housing 15 and extends into the housing through an eccentric cam 63 (to which it is keyed) through a carrier element 64 (free to rotate on the shaft) and terminates in a sun gear 65, to which it is keyed. In this transmission a higher gear ratio is desired, and thus a planet gear 66, which engages the sun gear 65, is meshed with an adjacent or second planet gear 67 which is not driven by the sun gear 65, but meshes with an output sun gear 68 (see FIG. 3). In the section of FIG. 2, the meshing planets are not shown for planet gears 66 and 67, but it can be appreciated that each meshes with the opposite type. Sun gear 68 is keyed to output shaft 69, which is eccentric with shaft 62, and which projects from the housing 15. A bayonet fitting 70 on the projecting end can be coupled with the weight or pounds register 17. The carrier, due to its higher gear ratio and particular construction, includes a top carrier plate 64a for better structural design.

To achieve the accurate weight of fuel or liquid passing through meter casing 11, the second transmission described above must be adjusted to reflect the API gravity or specific gravity of the fuel or liquid passing through the meter. This is accomplished by controlling the carrier 64 in its incremental rotation, as previously described, in the first transmission, in relationship to changes in specific gravity. In operation, clutch ring 71 resists rotation of the carrier 64, and ratchet ring 72 provides the incremental rotational movement through the adjustment linkage, which is responsive to changes in specific gravity. The latter linkage is composed of two arms. Arm 73 is pivotedly connected to ratchet ring 72 and to arm 74. Arm 74 includes an intermediate lobe 75 engageable by eccentric cam 63. A spring 76 pulls arm 73 so the lobe 75 of arm 74 will engage the cam 63.

To adjust for differences in API gravity, the opposite end of arm 74 is connected to an adjusting block 78 with a pivot pin 79, so the arm is lifted in a slot in which it is inserted; see broken lines 78a and 78b defining the slot. Block 78 is carried by a shaft 80, which is positioned by gravity responsive means. To ensure accurate positioning, one end of shaft 80 has a pivot joint 82 with a spring arm 81, which in turn is connected on the housing 15 so it urges shaft 80 in the direction of joint 82. The pivot joint 82 includes a roller that is pressed against a ramp cam 83 by the spring arm 81. This ramp cam is held in a split guide 85 so that a gear 86 on the shaft of a selsyn motor 87 can engage a toothed rack on the cam to position the ramp reciprocally along the split guide. Thus, depending on the gravity sensed by a gravity-sensing means, the selsyn motor 87 will position the ramp cam to adjust these linkages, providing the necessary compensation for converting the gallon or volume output passing through the second transmission to register the actual weight on register 17.

Also connected to the shaft of selsyn motor 87 is a pointer 88 that cooperates with a dial 89 whereby the API gravity of the fuel at any given instant can be read through window 21 of housing 15 (see FIG. 3).

Figure 4:
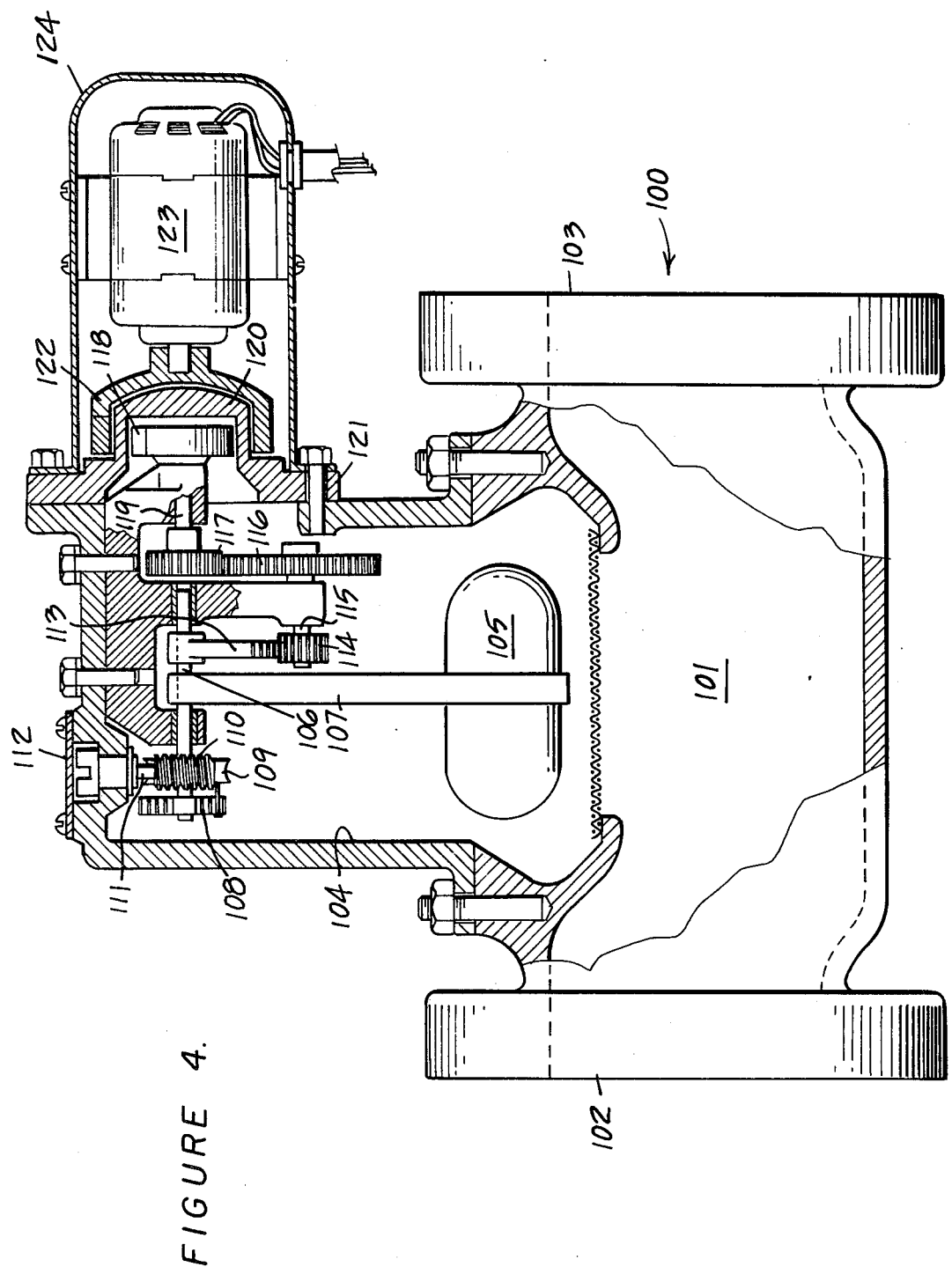
FIG. 4 is an elevation of a gravity-sensing unit or converter with parts broken away to show the component's float chamber, its suspension, gear arrangements and remote transmitting selsyn unit.

To obtain the API gravity of the fuel for the above-described compensation for weight conversion, a separate gravity-sensing means is employed, which is shown in FIG. 4. This converter unit 100 includes a casing 101 having an inlet 102 and an outlet 103 so it can be connected in the fuel line adjacent to the liquid meter 10. At one side of the casing is a float chamber 104 in which a weighted float 105 is in communication with the liquid or fuel in the chamber. This float acts like the float in a hydrometer, thereby providing accurate information on specific gravity of the liquid or fuel passing through the converter.

The float 105 is supported by a shaft 106 through an arm 107, which causes the shaft to rotate as the float rises or sinks in the float chamber. At one end of the shaft is spiral spring 108 which has its innermost coil connected to the shaft and its outermost coil connected via a pin to a gear 109, which is free to rotate on the shaft. Rotating gear 109 through an adjusting worm gear 110 and shaft 111 provides a calibrating torque on the shaft. A service window 112, which can be sealed, provides access to the adjusting shaft. On the end of the shaft opposite the spiral spring is a sector gear 113 that drives pinion gear 114 as the float moves in the float chamber. The pinion gear drives a gear train composed of a shaft 115, gear 116 meshing with gear 117, which then drives a magnetic element 118 through shaft 119.

The magnetic element is in a cylindrical protrusion 120 of a brass cover plate 121, forming part of the float chamber 104. As a result, a sensing cup 122 can be fitted over the protrusion so there is adequate clearance, allowing the selsyn motor 123 (transmitter) on the shaft of which the cup is mounted to track the position of the internal magnetic element 118 without the necessity of a shaft seal. The cup and magnetic element both contain magnets in their circular peripheries to achieve position correspondence.

The output of selsyn motor 123 within a case 124 is of course connected via electrical cables to selsyn motor 87 in the meter to provide the API gravity information to accurately convert the gallons to pounds.

As the conversions from gallons to pounds are made continuously, this invention represents one of the most accurate meter systems available, due to dual compensation.

In FIG. 6 a ratchet ring 41 is illustrated in section along with carrier 32. In operation, if the ratchet ring is rotated by the adjusting linkages in the direction of Arrow A, the spring-loaded balls 130 will wedge against the peripheral surface of the carrier, causing it to rotate with the ratchet ring. Of course, if the ratchet ring rotates in the opposite direction (opposed to Arrow A), the resistance of the clutch ring 40 will prevent the carrier from rotating with it as the ramped surfaces 131 of the ratchet ring allows balls 130 to travel on the peripheral surface of the carrier without wedging thereagainst. Since both ratchet rings 41 and 72 operate in the same manner, only one has been described.

Figure 7:
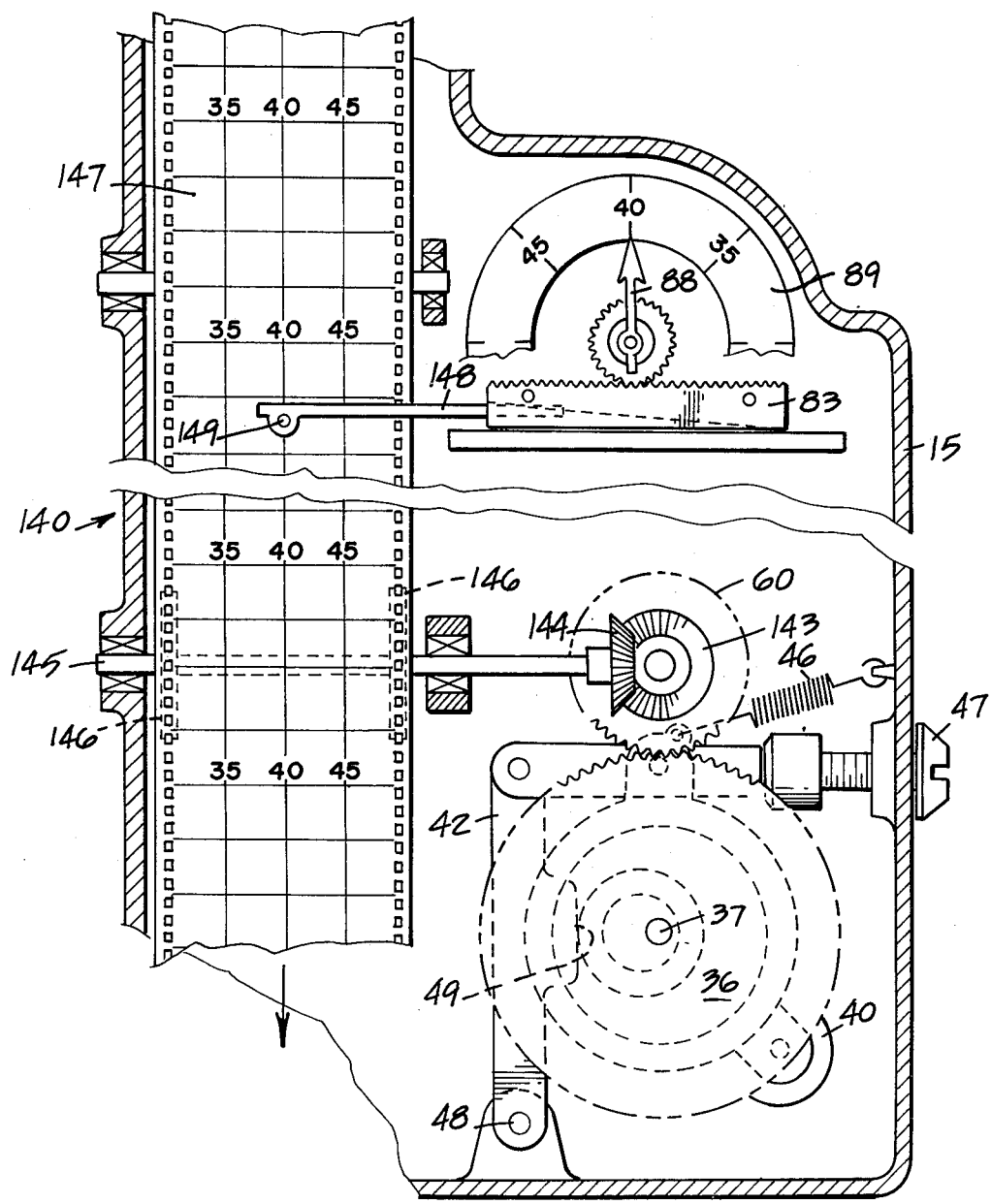
FIG. 7 is an alternate embodiment of the invention which includes a strip chart for recording volume (gallons) and density (API gravity) shown in section with parts broken away.

FIG. 7 shows a further modification of the device which has a continuous recording strip chart unit 140 that registers gallons while simultaneously marking the instantaneous API gravity on the strip chart for each gallon.

Basically, housing 15 is modified slightly to provide support structure 141 for the unit 140. In this embodiment, a bevel gear 143 is added to the take-off gear 60 and meshes with a second bevel gear 144 to drive shaft 145, which is oriented normal to the axis of gear 60. Mounted on this drive shaft are two spaced-apart sprocket wheels 146 that drive a strip chart 147 across a flat table as shaft 145 rotates. As can be appreciated, since the drive for the strip chart is taken off output gear 36, its advance is proportional to gallons or volume. As a result, it can be marked off in gallon units, so the latter can be calculated by counting these units. In addition, an arm 148 is connected to the ramp cam 83 so it extends over the strip chart, whereby an ink pen element 149 located in the distal end of the arm can mark the gravity on the strip chart as it advances. As shown, transverse spacings can be used to indicate the gravity readings, and the pen element can track therebetween to reflect the average gravity for each gallon passing through the liquid meter.

The strip chart provides a permanent record from which weight of the fuel or liquid can be calculated quite accurately.

Having described my invention above, it is my intent to claim such invention not only as described, but also in all the forms and variations as may be reasonably construed to be within the spirit of the invention and within the scope of the appended claims.

I claim:

1. A dual registering meter with separate registering devices indicating both volume and weight respectively of the liquid passing through a meter casing means with an inlet and outlet and a positive displacement mechanism therebetween operable to respond to the actual volume of the liquid passing through said meter casing means with an output shaft driven proportionately to such volume comprising:

a compensator housing mounted on said meter casing means having an input shaft operably driven by the output shaft of said meter casing means;

first compensating means within said compensator housing drivingly connected to said input shaft and having a transmission means, an adjusting means and an output, said adjusting means including a manual adjusting element and a temperature responsive element with the latter having communication with liquid passing through the meter casing being operable to incrementally vary said transmission means to cause said output to be compensated for volumetric error;

a first registering device connected to said output of said first compensating means and operable to indicate volumetric units passing through said meter casing means in response to said output;

second compensating means within said compensator housing drivingly connected to the output of said first compensating means, said second compensating means having a transmission means, an adjusting means and an output, said adjusting means being operably controlled to vary the transmission means in response to the density of a liquid passing through said meter casing means, said adjusting means including a density sensing means in communication with a liquid passing through said meter casing means which is operably connected to the adjusting means to vary the incremental adjustment to the transmission means; and second registering means connected to the output of said second compensating means operable to indicate the weight of the liquid passing through said meter casing means, whereby both the volume and weight of the liquid passing through said meter casing means is obtainable from said several registering means.

2. The dual registering meter defined in claim 1 wherein said first and second compensating means include planetary transmissions.

3. The dual registering meter defined in claim 1 wherein the gravity sensing means includes a visual indicator providing instantaneous gravity readings for a liquid passing through the meter casing means.

4. The dual registering meter defined in claim 1 wherein the output of the first compensating means is operably connected to drive a strip chart and the density sensing means is operably connected to drive a marking element contacting said strip chart to record the gravity versus volume of a liquid passing through the meter casing means, thereby providing the permanent record of the gravity versus volume of the liquid from which the weight of a quantity of liquid passing through the meter can be determined.

* * * * *